Dec. 18, 1962     H. W. CHRISTENSON     3,068,978
ONE-WAY ENGAGING MECHANISM
Filed Oct. 2, 1958
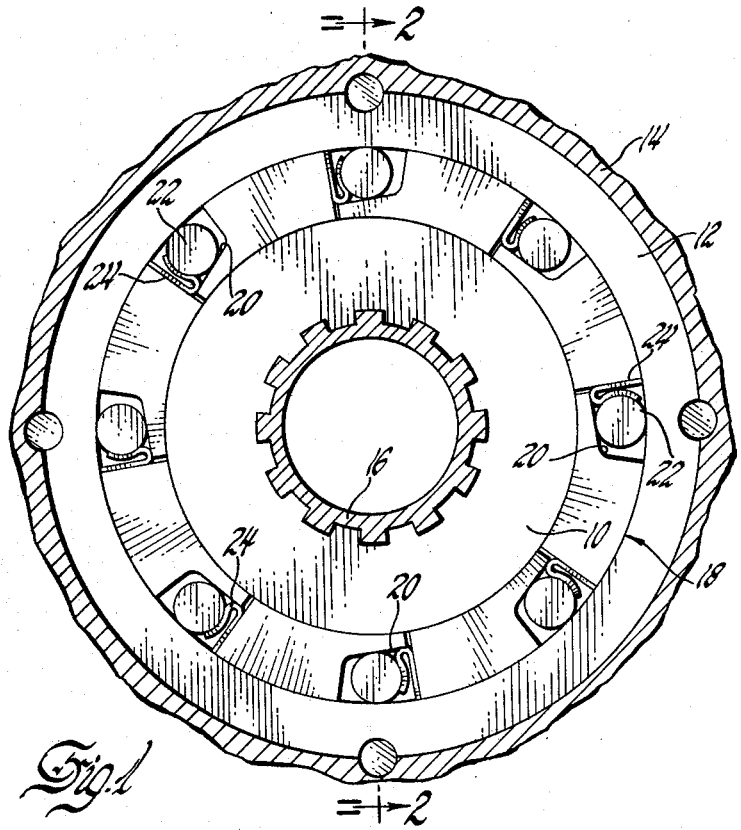
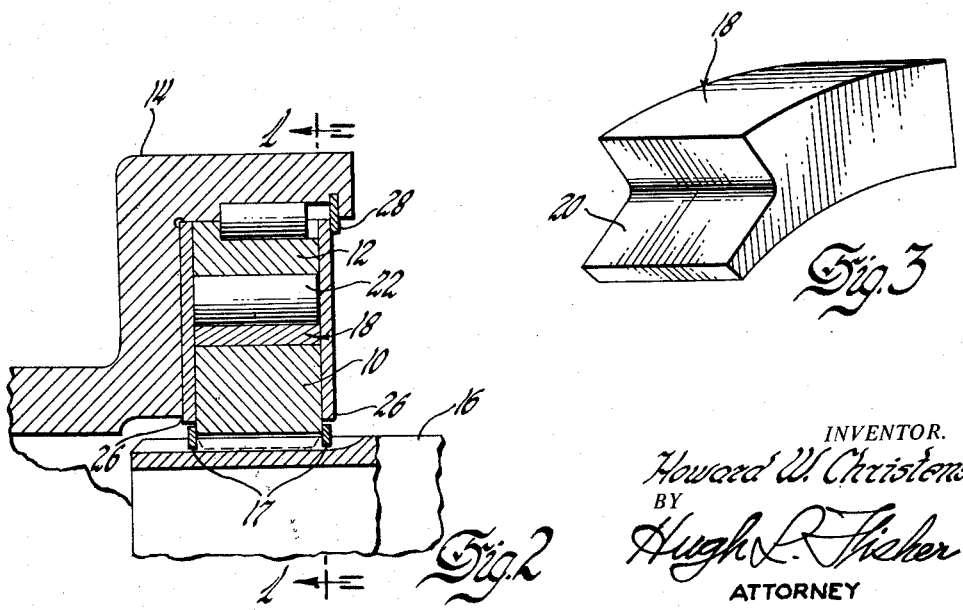
INVENTOR.
Howard W. Christenson
BY
Hugh L. Fisher
ATTORNEY United States Patent Office 3,068,978
Patented Dec. 18, 1962

3,068,978
ONE-WAY ENGAGING MECHANISM
Howard W. Christenson, Indianapolis, Ind., assignor to General Motors Corporation, Detroit, Mich., a corporation of Delaware
Filed Oct. 2, 1958, Ser. No. 764,985
5 Claims. (Cl. 192—45)

This invention relates to improvements in one-way engaging mechanisms of the character that have a series of locking elements interposed between concentric races so as to permit relative rotation therebetween in one direction only.

One of the primary concerns with any one-way engaging mechanism is durability. Excessive wear can cause the mechanism to malfunction which many times commences a chain reaction of unwanted events through the installation incorporating the mechanism. To exemplify, consider a simple one-way roller clutch of the kind comprising a cylindrical inner race, an outer race provided with a series of integral wedging surfaces, and a corresponding series of roller elements coacting with each wedging surface and the cylindrical surface on the outer race. Conventional energizing springs urge the roller elements towards the wedging position. During overrunning, when the clutch is released or disengaged, the roller elements tend to skip and skate along the inner race surfaces which is partially attributed to the energizing action of the springs. As a result, both the inner race and roller surfaces are affected and flats are developed on these surfaces. Moreover, repeated engagements of the clutch also tend to form flats because of the point contact along the engaging surfaces. Contributory, additionally, to wear of this nature is the lack of proper maintenance of concentricities between the races since eccentricity inherently produces uneven loading along the engaging surfaces. Obviously, then, the formation of these flats along the engaging surfaces of the races and roller elements seriously impairs the efficient operation of the clutch and ultimately it will fail.

With these problems in mind the invention contemplates the provision of a one-way engaging mechanism of novel structure that is simple in construction and suited for mass production techniques, that reduces unit loads, that eliminates relative movements between locking elements for the mechanism and the contacted race surface during disengagement and overrun, and that maintains the mechanism races concentric. Specifically, the invention affords the foregoing one-way engaging mechanism with a series of cam shoes which are interposed between the mechanism races. These cam shoes help to maintain the races concentric, and, additionally, in a unique way, distribute loads when the mechanism is engaged, as well as hold the locking elements in contact with one race when the mechanism is disengaged and overrunning so as to prevent relative movements between the locking element and the contacted race.

In carrying out the invention, according to one form thereof, a series of cam shoes are interposed between concentric cylindrical inner and outer races. Each cam shoe is afforded a wedging surface that coacts with a locking element. Each locking element normally engages the outer race cylindrical surface and the related cam shoe wedging surface and is urged towards the wedging position by an energizing spring. During engagement, the roller elements travel up the wedging surface until a lock-up occurs whereupon the resultant load on the inner race cylindrical surface is distributed over the entire engaging area of each cam shoe. Upon disengagement and with attainment of some selected overrunning speed, each of the cam shoes, due to the centrifugal force acting thereon, will move outwardly into tighter contact with the outer race cylindrical surface and out of engagement with the inner race cylindrical surface so that there is no frictional drag and the roller elements and cam shoes will revolve with the outer race. The running clearances afforded the cam shoes are such that the concentricity requirements between the inner and outer races are maintained within the desired limits, especially during movement to the engaged position at which time unequal loading presents a problem.

The foregoing and other objects and advantages of the invention will be apparent from the following description and the accompanying drawings, in which:

FIGURE 1 is a side elevational view of a one-way clutch embodying the principles of the invention along line 1—1 of FIGURE 2;

FIGURE 2 is a fragmentary sectional view along line 2—2 of FIGURE 1; and

FIGURE 3 is a perspective view of a cam shoe for the clutch.

Referring to the drawings, and particularly to FIGURES 1 and 2, the one-way engaging mechanism depicted is of the one-way clutch kind comprising inner and outer cylindrical races 10 and 12. The outer race 12 is joined to an input shaft 14 while the inner race 10 is splined to an output shaft 16 and is axially positioned thereon by snap rings 17. Although the shafts 14 and 16 have been designated, respectively, as input and output, they may be interchanged, i.e. shaft 16 may become the input and shaft 14 the output, or one of the shafts may be grounded, each of these possible variations being well understood by those versed in the art.

Interposed between the cylindrical races 10 and 12 are a series of cam shoes 18, each being contoured at the inner and outer peripheries thereof so as to conform, respectively, with the cylindrical surface on the inner race 10 and the cylindrical surface on the outer race 12. The fit of each cam shoe 18 between the races 10 and 12 is such that the clearances will afford a bearing support therebetween but with adequate running clearances existing so as to permit some radial displacement of each shoe 18. For example and without limitation, a total of .004 of an inch radial clearance may be permitted between the shoes 18 and the races 10 and 12. The series of cam shoes 18, as illustrated in FIGURE 1, when in engagement with the cylindrical surface on the inner race 10, form a continuous ring therearound with slight spaces between each being allowed so that the permissive tolerances for the construction of each shoe 18 are relatively unimportant and need not be maintained very closely. Otherwise, if each cam shoe 18 had to be contiguous with the adjacent cam shoe 18, then there would be a problem of maintaining exact dimensions with a probable need of selective assembly, i.e., each cam shoe 18 would have to be chosen of a certain size so as to eliminate any gaps between the shoes 18.

As viewed in FIGURE 3, each of the cam shoes 18, at one edge thereof, are relieved or notched to form a tapered wedging surface at 20 extending from a side edge upwardly to the edge of the notch with a predetermined slope or upward slant. Within the space afforded by the notch, a locking element, such as roller element 22, is mounted along with an energizing spring 24 of the configuration shown. Each of the springs 24 is effective both to urge its adjacent shoe 18 inwardly and its related roller element 22 towards a wedging or locking position which, in FIGURE 1, is up the wedging surface 20 and in contact both with the wedging surface 20 and the cylindrical surface of the outer race 12. Thus, each roller element 22 is prepared to lock at the same time whenever the one-way clutch is engaged and assures that each roller element 22 assumes its proportionate share of the load.

The assemblage is completed, as observed in FIGURE 2, by a pair of spacers 26, one on each side of the one-way clutch, to furnish an enclosure therefor. The one-way clutch components, then, are positioned axially with respect to the input shaft 14 by an appropriate retainer, e.g., a snap ring 28 supported by input shaft 14.

To explain the function of the one-way clutch, suppose first that an attempt is made to revolve the input shaft 14, in the FIGURE 1 illustration, faster clockwise than the output shaft 16, or that the output shaft 16 is held stationary while torque is being applied to the input shaft 14 so as to create a tendency for the shaft 14 to turn clockwise. When this happens, each of the roller elements 22 will climb the wedging surfaces 20 and assume the aforegoing described locking position in which snug point or line contact is made by each roller element 22 with the corresponding wedging surface 20 and the cylindrical surface of the outer race 12. This locking action produces a load that forces each cam shoe 18 into holding engagement with the cylindrical surface on the inner race 10. As a result, unit loads are distributed over the entire area of each cam shoe 18 in engagement with the surface of the inner race 10.

It is preferable to distribute the loads over the inner race, since the inner race 10 being of smaller diameter than the outer race 12 is subjected to greater potential wear. Also, particularly prior to and when the one-way clutch is engaged, the bearing support function of each cam shoe 18 becomes important since the maintenance of the concentricity of the races 10 and 12 is essential for proper alignment and assurance against some of the roller elements 22 assuming a greater load than others.

Now, assume that input shaft 14 is revolved counter-clockwise, as seen in FIGURE 1, with the output shaft 16 either held or revolved clockwise. If engaged, the one-way clutch will release, and as the outer race 12 develops a certain speed, centrifugal force resulting therefrom will become effective to force each of the cam shoes 18 outwardly against the opposition from the energizing springs 24 and into an engagement with the outer race surface. A balance will be achieved so as to cause each cam shoe 18 to revolve with the outer race 12. Since each roller element 22 will be carried during overrun, with the corresponding cam shoe 18, no skipping or skating by the roller elements 22 along the outer race surface and the wedging surfaces 20 can take place, there being no relative motion. Furthermore, each of the cam shoes 18, because of the aforementioned permissive radial displacement, will be clear of the inner race 10. Thus, there is no interference with the rotation of the inner race 10 tending to create drag and resultant wear. But an adequate bearing support will still exist, for if the lubricant, which is always required, produces a film of, for example, .001 of an inch on each race surface and the previously suggested .004 of an inch radial clearance is assumed, there will be a .002 radial clearance between the shoes 18 and the surface of the inner race 10. This .002 radial clearance is sufficient to insure proper concentric alignment between the races 10 and 12 and presumes that the lubricant will resist displacement and prevent metal to metal contact. Of course, the .002 radial clearance can be varied to meet different demands.

From the foregoing, it can be seen that a one-way clutch, constructed according to the invention, offers manufacturing advantages over the type one-way clutch that has wedging surfaces integral with one of the races. In this latter type construction, a defect in one wedging surface would generally necessitate the scrapping of the entire race, while with the disclosed one-way clutch only a single cam shoe need be discarded and can be easily replaced considerably more economically than an entire race. Additionally, the load distribution at lock-up or engagement of the one-way clutch along with the fact that there is no relative motion between the roller elements 22 and the contacted surfaces during overrun of the one-way clutch will increase the durability of the clutch considerably.

The invention is to be limited only by the following claims.

I claim:
1. A one-way engaging mechanism comprising a pair of concentric races, a series of individual cam shoes interposed between the races, each of the cam shoes being shaped to fit both races so as to provide a bearing support therebetween when the mechanism is disengaged and also being provided with a wedging surface, and a corresponding series of locking elements each being arranged between one of the races and the related cam shoe wedging surface.

2. A one-way engaging mechanism comprising inner and outer concentric races, a series of individual cam shoes interposed between the races, each of the cam shoes being shaped to fit both races so as to provide a bearing support therebetween when the mechanism is disengaged and each including a wedging surface, a corresponding series of locking elements each being arranged between one of the races and the related cam shoe wedging surface, each of the cam shoes having limited radial movement between the races so that, when the mechanism is disengaged and the outer race is revolved, each of the cam shoes will be urged outwardly by centrifugal force so as to cause the locking elements and cam shoes to revolve with the outer race as a unit free of the inner race but while still affording the bearing support.

3. A one-way engaging mechanism comprising inner and outer concentric races, a series of individual cam shoes interposed between the races so as to afford concentric alignment therebetween with each of the cam shoes having limited radial movement, the shoes also being arranged to provide a bearing support between the races when the mechanism is disengaged, each of the cam shoes being provided with a wedging surface, a corresponding series of locking elements each being arranged between one of the races and the related cam shoe wedging surface, and means for urging the locking elements towards the engaged position for the mechanism relative to the wedging surface and said one of the races, the cam shoes and races being so arranged when the mechanism is disengaged and the outer race is being revolved that each of the cam shoes will be urged outwardly by centrifugal force thereby causing the locking elements and cam shoes to be revolved with the outer race as a unit free of the inner race but while still affording the bearing support and when the mechanism is engaged that each of the cam shoes will have a substantial area thereof in engagement with the other of the races so as to distribute the braking load uniformly over said other of the races.

4. A one-way engaging mechanism comprising inner and outer concentric races, each being provided with cylindrical surfaces, a series of individual cam shoes interposed between the races so as to afford concentric alignment of the races with each shoe being permitted limited radial movement therebetween, the shoes also being arranged to provide a bearing support between the races when the mechanism is disengaged, each of the cam shoes having formed thereon a wedging surface, a corresponding series of locking elements each being disposed between the cylindrical surface of the outer race and the related cam shoe wedging surface, biasing means for urging the locking elements towards an engaged position for the mechanism relative to the wedging surface and the cylindrical surface of the outer race, the cam shoes and races being so arranged when the mechanism is disengaged and the outer race is being revolved that each of the cam shoes will be urged outwardly by centrifugal force thereby causing the locking elements and the cam shoes to revolve with the outer race as a unit free of the inner race but while still affording the bearing support and when the mechanism is engaged that each of the cam shoes will form a continuous ring in engagement with the inner race cylindrical surface so as to have a maximum area in engagement therewith to distribute the braking load uniformly over the inner race cylindrical surface.

5. A one-way engaging mechanism comprising inner and outer concentric races, each being provided with cylindrical surfaces, a series of individual cam shoes interposed between the races, each of the cam shoes having cylindrical inner and outer surfaces engageable, respectively, with the inner and outer race cylindrical surfaces so as to provide a bearing support therebetween when the mechanism is disengaged and being of a size that permits limited radial movement between the races, each of the cam shoes having formed thereon a wedging surface, a corresponding series of roller elements each being disposed between the cylindrical surface of the outer race and the related cam shoe wedging surface, a plurality of springs for urging the roller elements towards the engaged position for the mechanism relative to the wedging surface and the cylindrical surface of the outer race, the cam shoes and races being so arranged when the mechanism is disengaged and the outer race is being revolved that each of the cam shoes will be urged outwardly by centrifugal force thereby causing the roller elements and the cam shoes to revolve with the outer race as a unit free of the inner race cylindrical surface and when the mechanism is engaged that each of the cam shoes will form a continuous ring with the inner cylindrical surface of each in engagement with the cylindrical surface of the inner race so as to have a maximum area in engagement therewith to distribute the braking load uniformly over the inner race cylindrical surface.

References Cited in the file of this patent

UNITED STATES PATENTS

| | | |
|---|---|---|
| 800,853 | Kimball | Oct. 3, 1905 |
| 1,942,909 | Von Thungen | Jan. 9, 1934 |
| 1,986,160 | Pomeroy | Jan. 1, 1935 |
| 2,039,149 | Dodge | Apr. 28, 1936 |
| 2,044,197 | Barthel | June 16, 1936 |

FOREIGN PATENTS

| | | |
|---|---|---|
| 883,503 | France | Mar. 29, 1943 |